United States Patent [19]

Dola et al.

[11] 4,156,103
[45] May 22, 1979

[54] SEMI-RIGID CONDUIT CONNECTOR

[75] Inventors: Frank P. Dola, Port Richey; Frederick W. Rossler, Jr., New Port Richey, both of Fla.; Kermit M. Jones, Jr.; William B. Long, both of Camp Hill, Pa.

[73] Assignee: AMP Incorporated, Harrisburg, Pa.

[21] Appl. No.: 846,243

[22] Filed: Oct. 27, 1977

[51] Int. Cl.² .................................................. H02G 3/06
[52] U.S. Cl. .................................... 174/65 R; 285/162
[58] Field of Search ............... 174/65 R; 248/56; 285/158, 162; 403/201, 194, 197, 199; 220/62

[56] References Cited

U.S. PATENT DOCUMENTS

| 1,793,882 | 2/1931 | Yanchenko | 285/217 |
|---|---|---|---|
| 2,458,409 | 1/1949 | Paige | 285/162 |
| 3,019,957 | 2/1962 | Palmer | 220/62 X |
| 3,174,776 | 3/1965 | Berger | 285/162 |
| 3,183,297 | 5/1965 | Curtiss | 174/65 R |
| 3,193,613 | 7/1965 | Van Buren, Jr. | 174/65 G |
| 3,424,416 | 1/1969 | Dell et al. | 248/56 |
| 3,788,582 | 1/1974 | Swanquist | 248/56 |
| 3,814,467 | 6/1974 | Van Buren, Jr. | 285/162 X |
| 3,993,333 | 11/1976 | Biswas | 285/158 X |
| 4,012,578 | 3/1977 | Moran et al. | 174/51 |
| 4,021,604 | 5/1977 | Dola et al. | 174/51 |

Primary Examiner—Arthur T. Grimley
Assistant Examiner—D. A. Tone
Attorney, Agent, or Firm—Russell J. Egan

[57] ABSTRACT

A stamped and formed connector for connecting semi-rigid conduit to electric boxes is disclosed. The subject connector is stamped from flat sheet metal stock in continuous fashion and is subsequently formed to have a conduit engaging portion and a connector box engaging portion. An end of a length of semi-rigid conduit is securely held in an aperture in the base of the connector while the connector itself can be readily mounted in an aperture of a junction box or the like.

8 Claims, 5 Drawing Figures

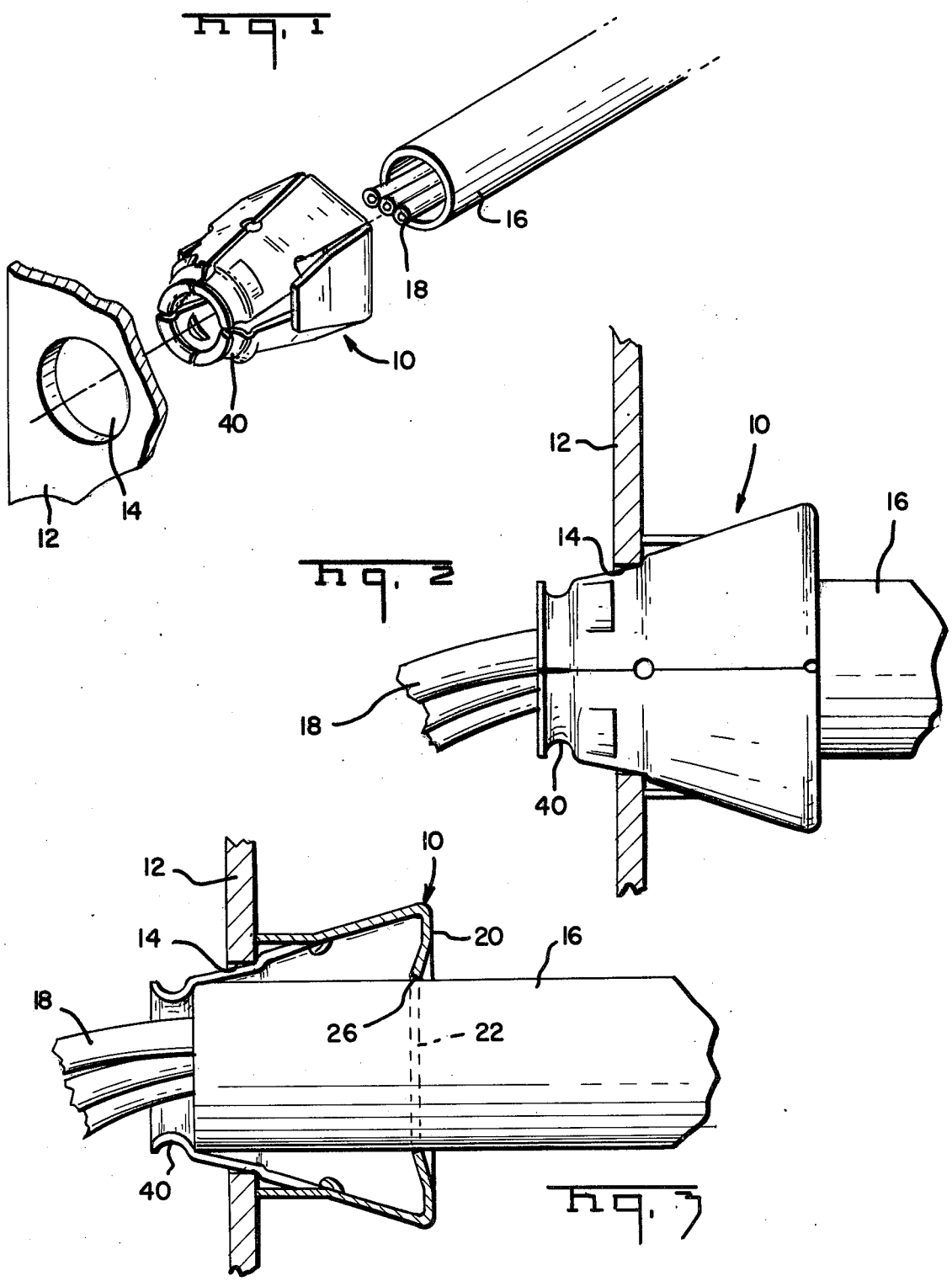

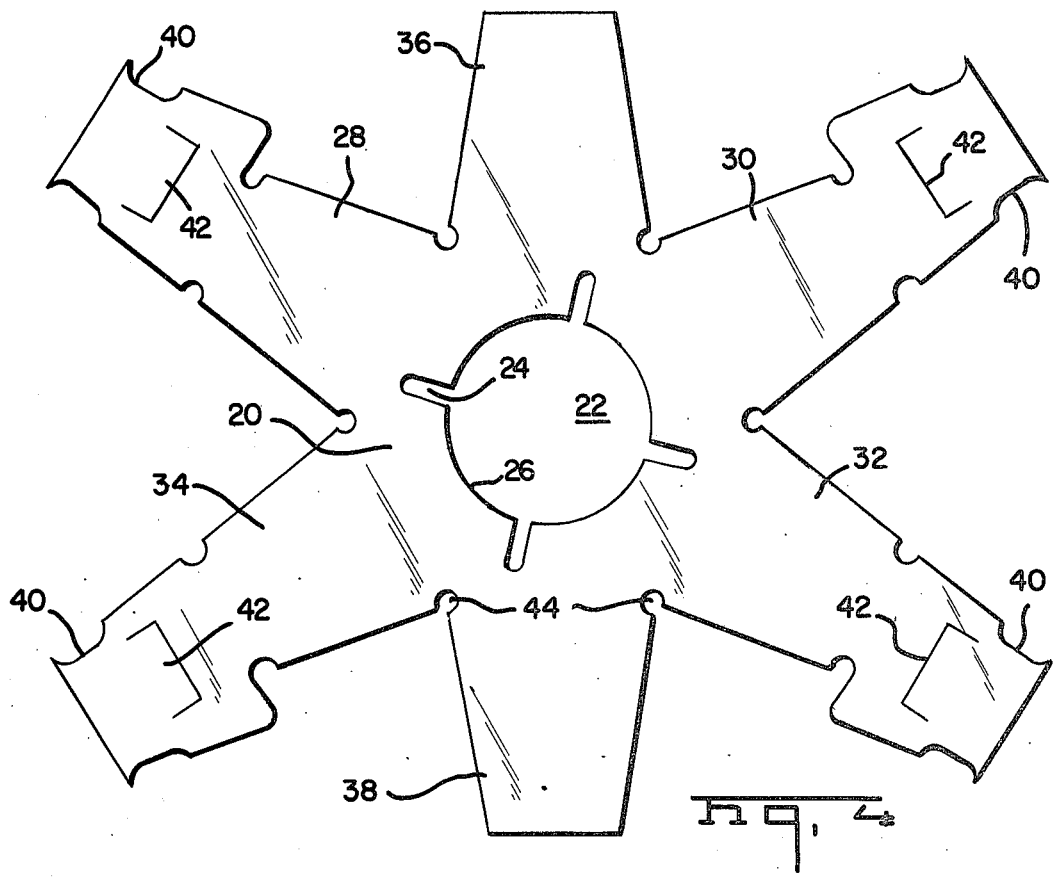
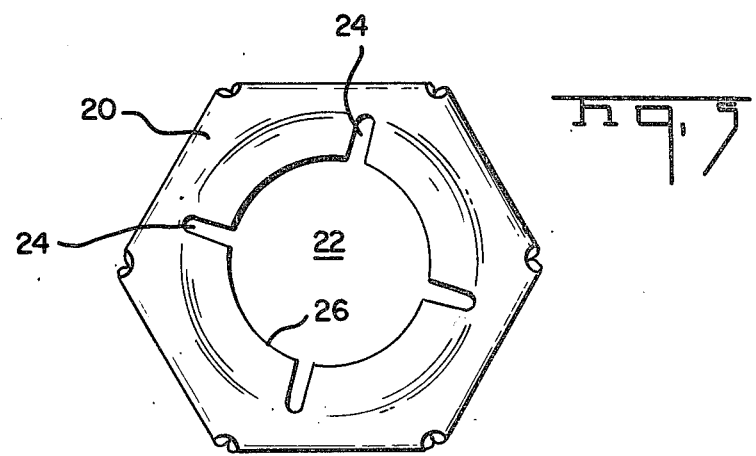

SEMI-RIGID CONDUIT CONNECTOR

BACKGROUND OF THE INVENTION

1. The Field Of The Invention

The present invention relates to a stamped and formed metallic connector for securing semi-rigid conduit to an electrical box or the like.

2. The Prior Art

There are many well known devices for connecting conduit to junction boxes and the like. Examples of these may be found in U.S. Pat. Nos. 3,174,776 and 3,788,582. The difficulty with these devices is that they require the use of a screw to effect assembly.

Another known example of a conduit connector is found in U.S. Pat. No. 3,193,613. This device, however, also involves assembly problems in that it requires a member to be inserted into the conduit to radially outwardly deform a portion thereof to engage an outer member which is placed on the exterior of the conduit and secured thereto.

A further class of known connectors is represented by U.S. Pat. Nos. 3,183,297; 3,424,416; 3,412,578; and 3,021,604. All of these devices are related to conduit which is formed with a helical or screw thread configuration on the exterior thereof. This threading is used to receive the cable in the connector and secure it in position.

SUMMARY OF THE INVENTION

The present invention provides a solution to the problems of high manufacturing and installations costs which are represented by the above discussed patents. The subject invention consists of a one piece metal connector which is stamped and formed from a continuous sheet of web material. The connector has, in a base portion, an aperture surrounded by arcuate flanges. An end of the conduit is inserted into the aperture and grasped by the arcuate flanges in such fashion as to deter withdrawal therefrom. The opposite end of the connector is then inserted into an aperture in a junction box or the like where it tightly secures the conduit in such a fashion as to prevent intrusion by foreign objects.

It is therefore an object of the present invention to produce an improved connector for securing semi-rigid conduit to a junction box or the like.

It is another object of the present invention to provide a semi-rigid electrical conduit connector having a one piece construction.

It is a further object of the present invention to provide an electrical conduit connector that is relatively inexpensive to produce and install.

It is a further object of the present invention to produce an improved connector for joining semi-rigid conduit to junction boxes, which connector can be readily and economically manufactured.

The foregoing objects and other advantages of the present invention will become apparent from the following detailed description taken in connection with the accompanying drawings.

BRIEF DESCRIPTION OF THE DRAWINGS

FIG. 1 is an exploded perspective view of the subject conduit connector;

FIG. 2 is a side elevation of the subject conduit connector engaging both an end of a piece of semi-rigid conduit and a panel wall;

FIG. 3 is a section view through the connector of FIG. 2;

FIG. 4 is a plan view of the blank for forming the subject electrical conduit connector; and FIG. 5 is a rear view of the formed conduit connector according to the present invention.

DETAILED DESCRIPTION OF THE PREFERRED EMBODIMENT

The subject improved one piece of electrical conduit connector 10 is shown in FIG. 1 exploded from a wall 12 of a junction box or the like having an aperture 14 therein and a conduit 16 of semi-rigid material having a plurality of wires 18 passing therethrough. The subject connector 10 includes a generally hexagonal base 20 having a central aperture 22 and a plurality of radial slots 24 extending from the aperture to define a plurality of flanges 26 therebetween. Four sidewalls 28, 30, 32, and 34 and two stabilizing or latching walls 36, 38 extend from respective sides of the base 20. The sidewalls 28, 30, 32, 34, each include a profiled free end including a neck portion 40 and an adjacent rearwardly directed locking lance 42. The intersection of each of the sidewalls 28, 30, 32, 34 and the latching walls 36, 38 with the base 20 preferably is circular in configuration, as shown at 44, to prevent tearing of the base 20. Likewise it should be noted that the radial slots 24 are not in alignment with any of the intersections of the sidewalls and locking walls, which would greatly weaken the connector at that location.

When a semi-rigid electrical conduit 16 is to be connected to a junction box or the like 12, the subject clip 10 is slipped over the free end of the conduit and then inserted into an aperture in the junction box. It should be noted that this connection sequence possibly could be reversed with the clip being installed in the box and then the conduit inserted into the clip. The clip engages in the aperture in the box with the flanges 42 engaging the inner surface while the stabilizing or latching legs 36, 38 engage the outer surface.

The forward end of the connector side arms are arcuately formed and together define a substantially closed ring with a smooth transition surface. This allows for the wires 18 to extend through the arms without abrasion.

The base is formed into a dish-like configuration so that the arcuate flange portions 26 between the slots 24 will act in the manner of a Chinese finger trap preventing the withdrawal of the conduit from the connector once an end of the semi-rigid conduit is inserted therein. It should also be noted that the fully inserted conduit will tend to push the free ends of the sidewalls 28, 30, 32, 34 outwardly so that the latches 42 thereon will engage the inner surface of the panel wall.

The present invention may be subject to many modifications and changes without departing from the spirit or essential characteristics thereof. The present embodiment should therefore be considered in all respects as illustrative and not restrictive of the scope of the invention.

What is claimed is:

1. In combination with a semi-rigid electrical conduit having electrical wires therein and a generally round aperture in a wall portion of a junction box or the like, a one piece, self retaining, metal, conduit connector adapted to extend through said aperture and secure said conduit therein, said connector comprising:

a base portion having an aperture therein into which one end of said electrical conduit extends, said aperture having radially directed slots defining a plurality of arcuate flanges therebetween, said flanges being bent with respect to said base portion to facilitate passage of said semi-rigid electrical conduit therethrough in a first direction and oppose withdrawal in the opposite direction;

a plurality of sidewalls integrally extending from said base at an angle to the plane of said base, at least two of said walls being latching walls oppositely spaced and shorter than the remaining walls;

latching means formed adjacent the free ends of each of said remaining walls, the free ends of said remaining walls being profiled to define an entryway having a smooth transition surface, whereby a conduit received through said aperture in the base portion of said connector and said connector is secured in said round aperture in said junction box by engagement of said latching walls on a first side and said latching means on a second side of said wall portion.

2. A one piece, self retaining, metal, electrical conduit connector in the combination according to claim 1 wherein said radial slots are out of alignment with junctures of adjacent sidewalls with said base portion.

3. A one piece, self retaining, metal, electrical conduit connector in the combination according to claim 1 wherein:

said base portion has a hexagonal outer profile with sidewalls extending from each side thereof.

4. A one piece, self retaining, metal, electrical conduit connector in the combination according to claim 1 wherein:

the intersections between adjacent sidewalls where they meet said base portion has a circular profile whereby tearing of said base portion is prevented.

5. A one piece, self retaining, metal, electrical conduit connector for securing a semi-rigid electrical conduit containing electrical wires into a generally round aperture in a wall portion of a junction box or the like, said connector comprising:

a base portion having an aperture therein adapted to receive one end of said electrical conduit, said aperture having radially directed slots defining a plurality of arcuate flanges therebetween, said flanges being bent with respect to said base portion whereby passage of said semi-rigid electrical conduit therethrough in a first direction is facilitated and withdrawal in the opposite direction is opposed;

a plurality of sidewalls integrally extending from said base and being bent with respect to the plane of said base, at least two of said walls being latching walls oppositely spaced and shorter than the remaining walls;

latching means formed adjacent the free ends of each of said remaining walls;

the free ends of said remaining walls being profiled to define an annular entry having a smooth transition surface, whereby said conduit is received through said aperture in the base portion of said connector and said connector is secured in said round aperture in said sidewall of said junction box by engagement of said latching walls on a first side and said latching means on a second side of said wall portion.

6. A one piece, self retaining, metal, electrical conduit connector according to claim 5 wherein said radial slots are out of alignment with junctures of adjacent sidewalls with said base portion.

7. A one piece, self retaining, metal, electrical conduit connector according to claim 5 wherein:

said base portion has a hexagonal outer profile with sidewalls extending from each side thereof.

8. A one piece, self retaining, metal, electrical conduit connector according to claim 5 wherein:

the intersections between adjacent sidewalls where they meet said base portion has a circular profile whereby tearing of said base portion is prevented.

* * * * *